United States Patent
Milburn et al.

(10) Patent No.: US 11,136,915 B2
(45) Date of Patent: Oct. 5, 2021

(54) WASTEGATE ASSEMBLY AND TURBOCHARGER INCLUDING THE SAME

(71) Applicant: BorgWarner Inc., Auburn Hills, MI (US)

(72) Inventors: Alexander George Milburn, Asheville, NC (US); Matthew Brian Cooley, Asheville, NC (US); Kai Tanaka, Mills River, NC (US)

(73) Assignee: Borg Warner Inc., Auburn Hills, MI (US)

(*) Notice: Subject to any disclaimer, the term of this patent is extended or adjusted under 35 U.S.C. 154(b) by 5 days.

(21) Appl. No.: 16/704,361

(22) Filed: Dec. 5, 2019

(65) Prior Publication Data

US 2021/0172370 A1    Jun. 10, 2021

(51) Int. Cl.
  *F02B 37/18* (2006.01)
  *F02C 5/00* (2006.01)
  *F02C 9/18* (2006.01)

(52) U.S. Cl.
  CPC .............. *F02B 37/186* (2013.01); *F02C 5/00* (2013.01); *F02C 9/18* (2013.01); *F05D 2220/40* (2013.01); *F05D 2230/60* (2013.01)

(58) Field of Classification Search
  CPC combination set(s) only.
  See application file for complete search history.

(56) References Cited

U.S. PATENT DOCUMENTS

| 8,820,709 | B2 | 9/2014 | Lombard et al. |
| 10,047,760 | B2 | 8/2018 | Sanketh et al. |
| 10,138,803 | B2* | 11/2018 | Miazgowicz ......... F02B 37/186 |

(Continued)

FOREIGN PATENT DOCUMENTS

| DE | 102010043147 A1 | 10/2011 |
| DE | 102011007185 A1 | 10/2012 |

(Continued)

OTHER PUBLICATIONS

English language abstract and machine-assisted English translation for DE 10 2010 043 147 extracted from espacenet.com database on Dec. 12, 2019, 8 pages.

(Continued)

*Primary Examiner* — Jesse S Bogue
*Assistant Examiner* — Loren C Edwards
(74) *Attorney, Agent, or Firm* — Howard & Howard Attorneys PLLC

(57) ABSTRACT

A wastegate assembly includes a valve arm moveable between a first position and a second position to control flow of exhaust gas to a turbine housing interior of a turbocharger. The valve arm includes a proximal end, a distal end spaced from the proximal end, and a valve arm orientation projection spaced from the distal end and extending away from the proximal end. The wastegate assembly also includes a valve body coupled to the distal end of the valve arm that is moveable with the valve arm. The valve body includes a valve body orientation component, and the orientation projection of the valve arm extends toward and is orientable with the orientation component of the valve body to orient the valve arm relative to the valve body. The valve body is disposed between the orientation projection of the valve arm and the distal end of the valve arm.

21 Claims, 9 Drawing Sheets

(56) References Cited

U.S. PATENT DOCUMENTS

| | | | | |
|---|---|---|---|---|
| 2012/0234002 A1* | 9/2012 | Lombard | ............... | F01D 17/105 |
| | | | | 60/602 |
| 2013/0189072 A1* | 7/2013 | Wade | .................... | F02B 37/186 |
| | | | | 415/1 |
| 2015/0345375 A1 | 12/2015 | Grabowska | | |
| 2016/0146213 A1* | 5/2016 | Sanketh | .................. | F04D 17/10 |
| | | | | 415/145 |
| 2017/0261109 A1* | 9/2017 | Yanagida | .............. | F16K 1/2014 |
| 2019/0003376 A1 | 1/2019 | Schawer et al. | | |
| 2019/0003377 A1 | 1/2019 | Jaenike et al. | | |
| 2019/0112972 A1* | 4/2019 | Sadamitsu | ................ | F02C 6/12 |
| 2019/0170060 A1 | 6/2019 | Paulov | | |

FOREIGN PATENT DOCUMENTS

| | | |
|---|---|---|
| DE | 102011079573 A1 | 1/2013 |
| DE | 102012216893 A1 | 4/2014 |
| DE | 202018100815 U1 | 4/2018 |
| WO | 2018005254 A1 | 1/2018 |
| WO | 2018145908 A1 | 8/2018 |
| WO | 2019105853 A1 | 6/2019 |

OTHER PUBLICATIONS

English language abstract and machine-assisted English translation for DE 10 2011 007 185 extracted from espacenet.com database on Dec. 12, 2019, 7 pages.

English language abstract and machine-assisted English translation for DE 10 2011 079 573 extracted from espacenet.com database on Dec. 12, 2019, 8 pages.

English language abstract and machine-assisted English translation for DE 10 2012 216 893 extracted from espacenet.com database on Dec. 12, 2019, 8 pages.

Machine-assisted English language abstract and machine-assisted English translation for DE 20 2018 100 815 extracted from espacenet.com database on Dec. 16, 2019, 18 pages.

English language abstract and machine-assisted English translation for WO 2018/145908 extracted from espacenet.com database on Dec. 12, 2019, 13 pages.

English language abstract and machine-assisted English translation for WO 2019/105853 extracted from espacenet.com database on Dec. 12, 2019, 10 pages.

* cited by examiner

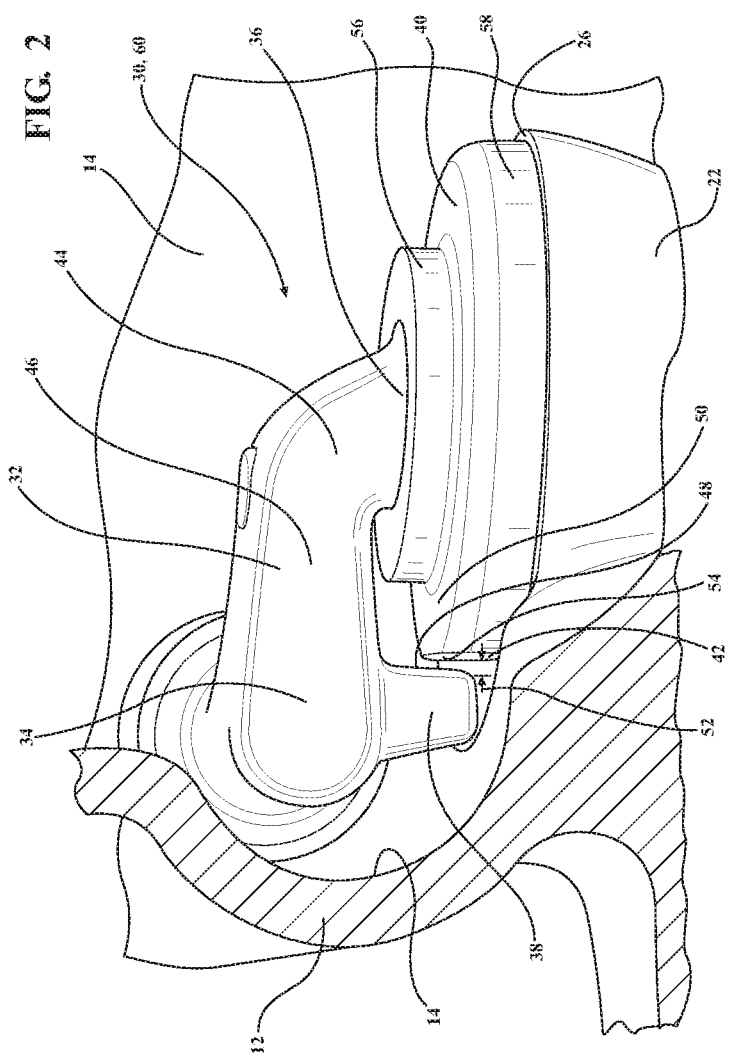

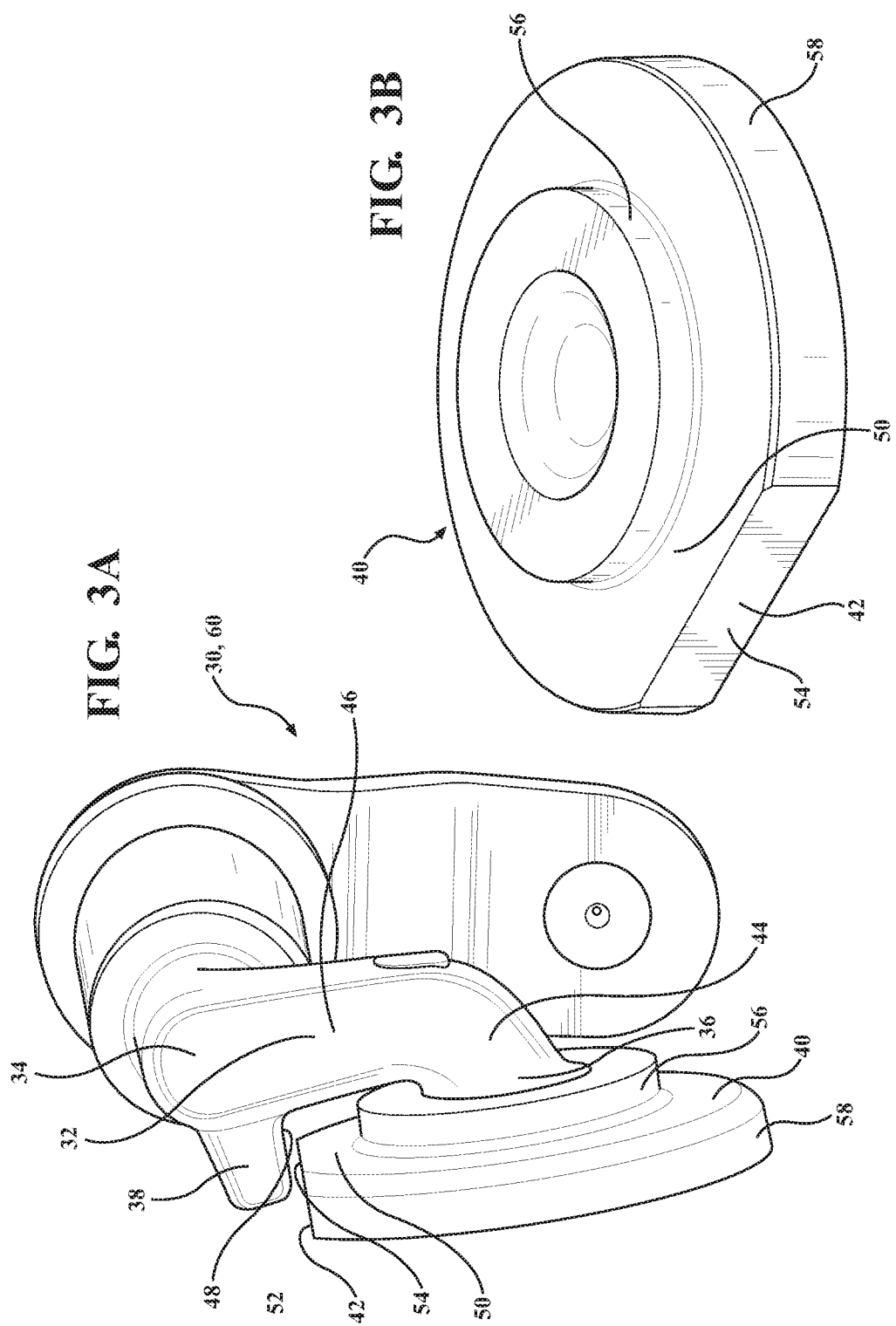

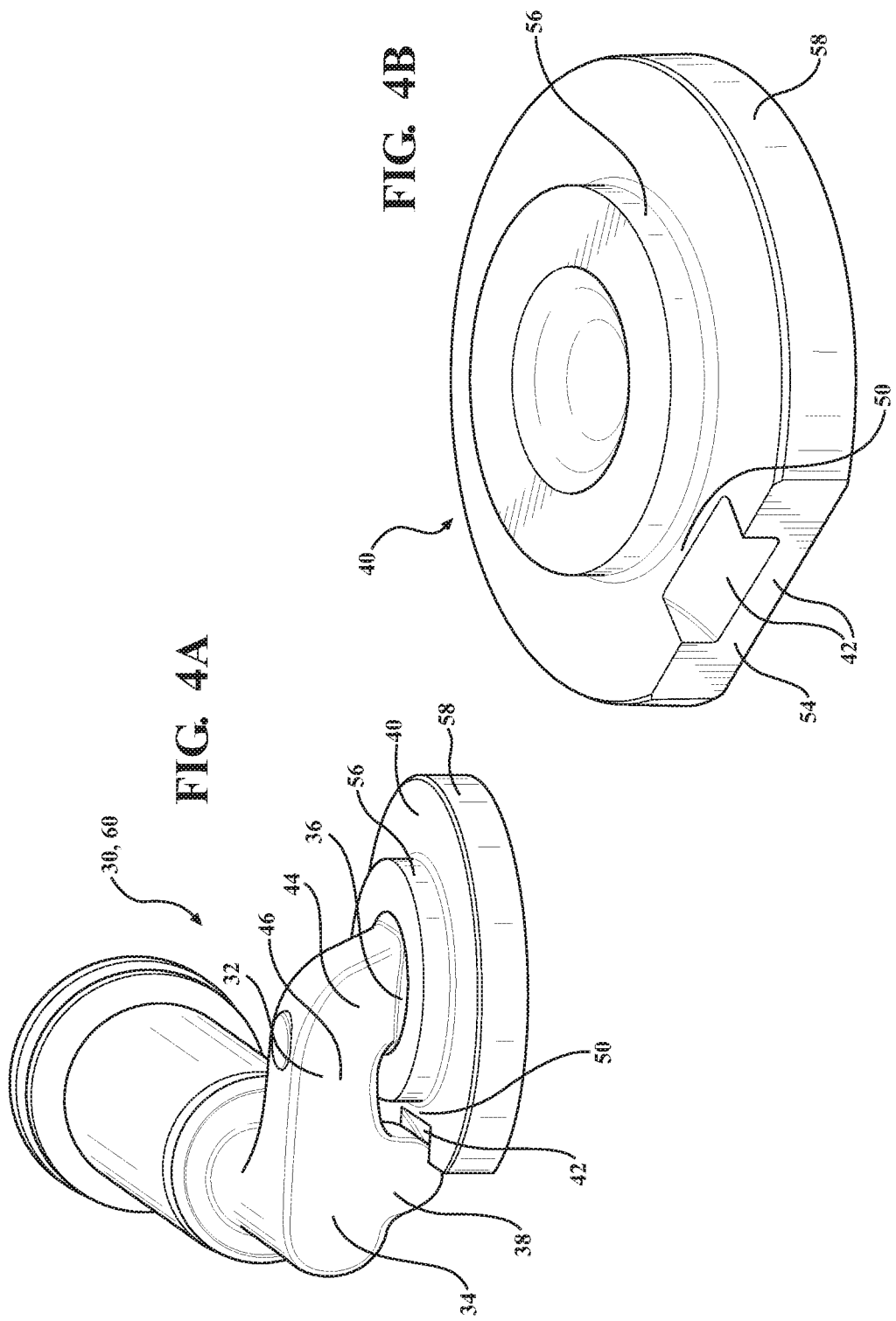

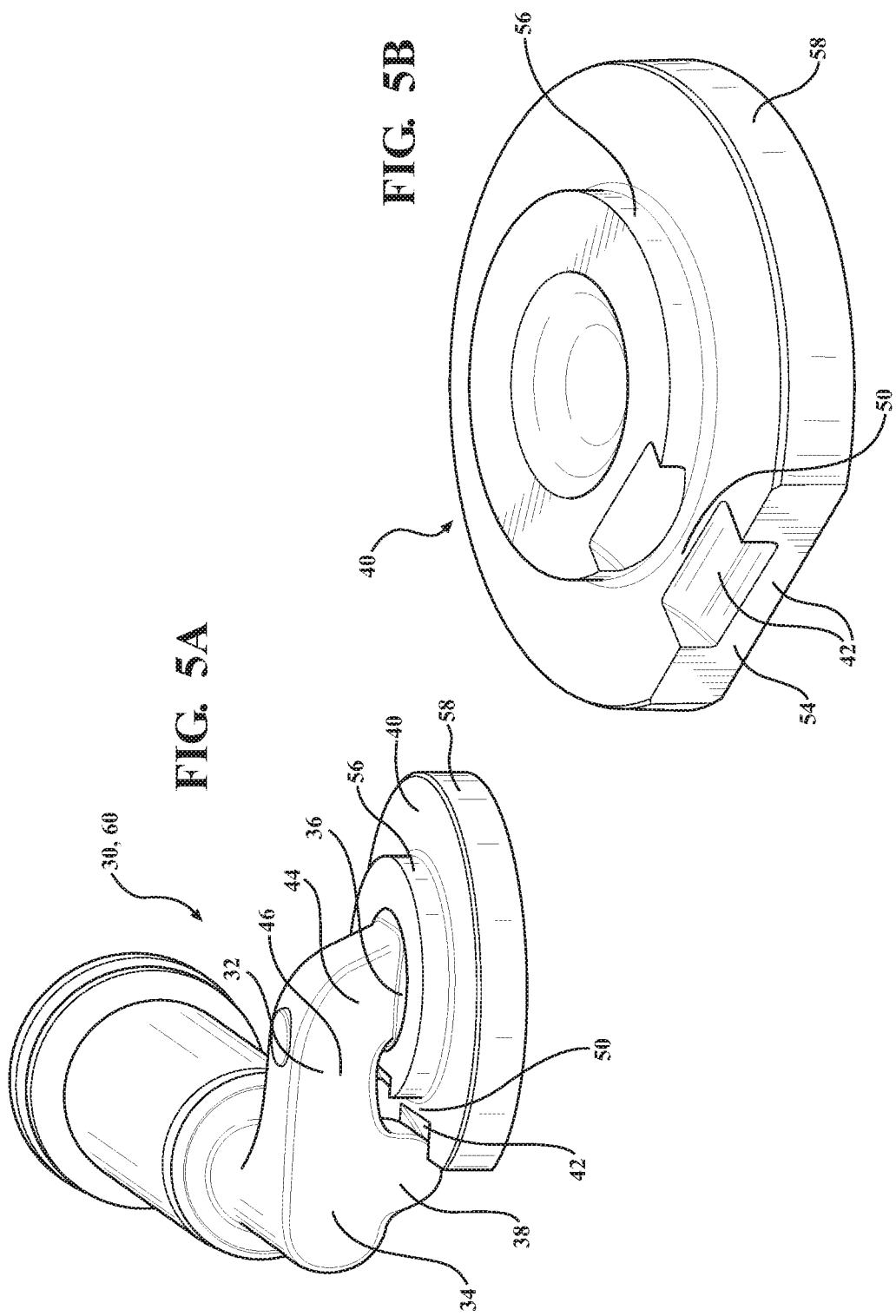

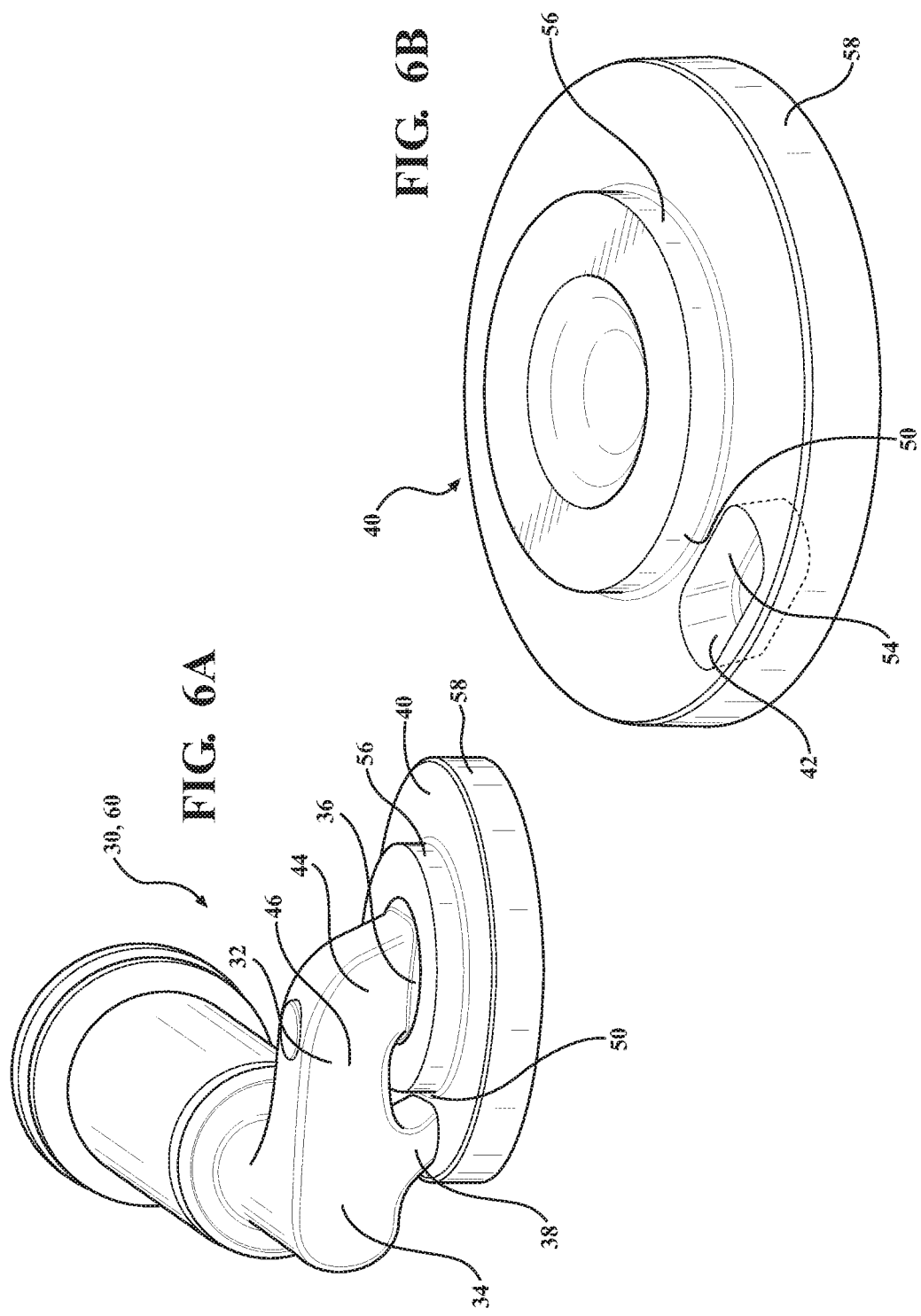

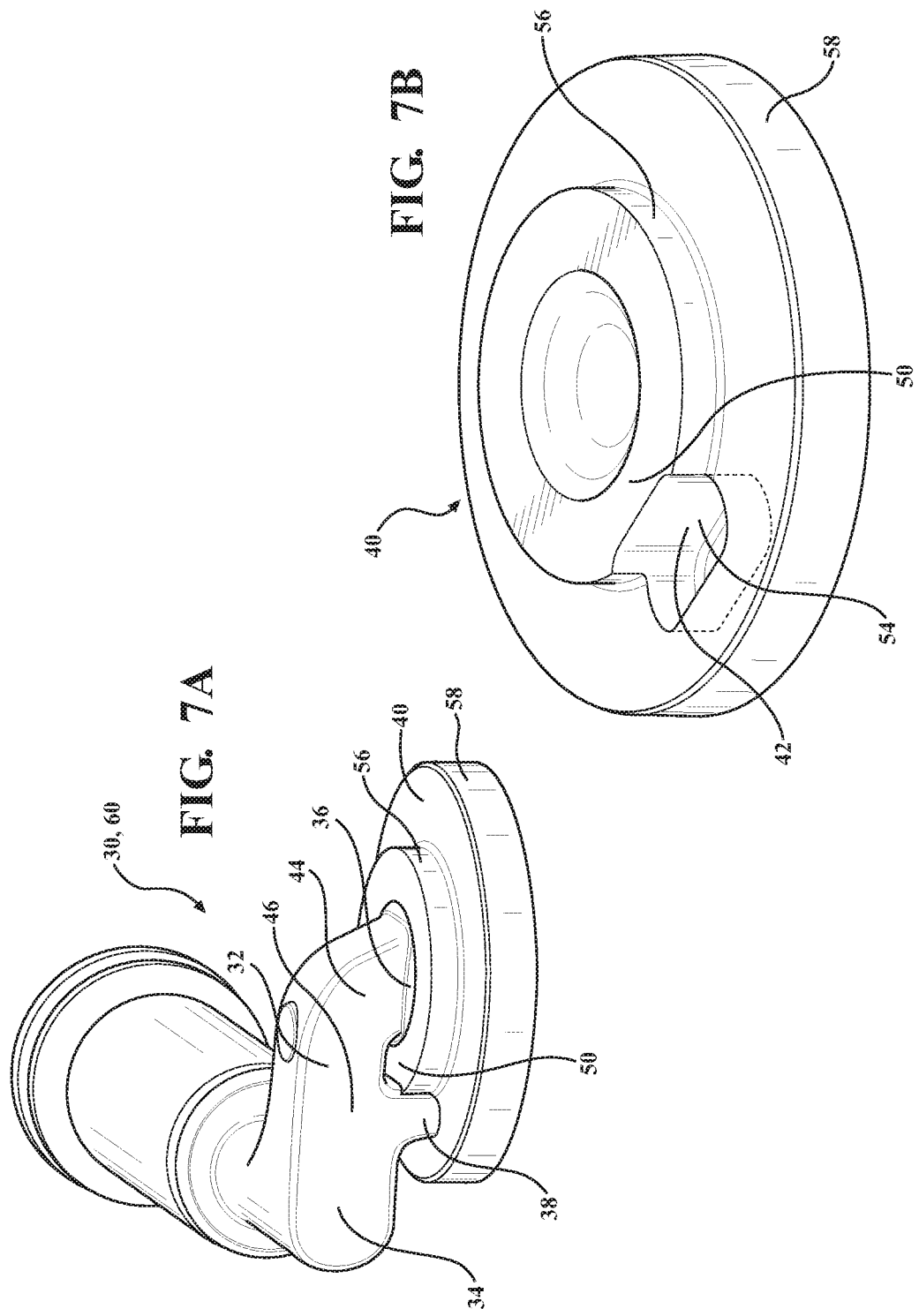

WASTEGATE ASSEMBLY AND TURBOCHARGER INCLUDING THE SAME

BACKGROUND OF THE INVENTION

1. Field of the Invention

The present invention relates generally to a wastegate assembly for controlling flow of exhaust gas to a turbine housing interior of a turbocharger and to a turbocharger including the wastegate assembly.

2. Description of the Related Art

Turbochargers receive exhaust gas from an internal combustion engine and deliver compressed air to the internal combustion engine. Turbochargers are used to increase power output of the internal combustion engine, lower fuel consumption of the internal combustion engine, and reduce emissions produced by the internal combustion engine. Delivery of compressed air to the internal combustion engine by the turbocharger allows the internal combustion engine to be smaller, yet able to develop the same or similar amount of horsepower as larger, naturally aspirated internal combustion engines. Having a smaller internal combustion engine for use in the vehicle reduces the mass and aerodynamic frontal area of the vehicle, which helps reduce fuel consumption of the internal combustion engine and improve fuel economy of the vehicle.

Typical turbochargers include a turbine housing, which includes an interior surface defining a turbine housing interior. The interior surface extends between a turbine housing inlet and a turbine housing outlet. The turbine housing inlet is defined at one end of the interior surface and is in fluid communication with the internal combustion engine and the turbine housing interior for delivering exhaust gas from the internal combustion engine to the turbine housing interior. The turbine housing outlet is defined at an opposite end of the interior surface and is in fluid communication with the turbine housing interior for discharging exhaust gas from the turbine housing interior.

Typical turbine housings also include a wastegate duct disposed downstream of the turbine housing inlet. The wastegate duct defines a wastegate channel in fluid communication with the turbine housing inlet for discharging exhaust gas from the turbine housing inlet by bypassing the turbine housing interior. A valve seat is typically disposed about the wastegate channel at a channel outlet of the wastegate channel.

In many conventional turbochargers, a wastegate assembly is disposed downstream of the turbine housing inlet for controlling flow of exhaust gas from the internal combustion engine and through the wastegate channel. A typical wastegate assembly includes a valve arm and a valve body coupled to the valve arm, with the valve arm and the valve body moveable between a first position and a second position to control flow of the exhaust gas to the turbine housing interior of the turbocharger. In the first position, the valve body is fully closed and engaged with the valve seat to prevent flow of exhaust gas through the wastegate channel defined by the wastegate duct. In the second position, the valve body is fully open and disengaged with the valve seat to allow flow of exhaust gas through the wastegate channel defined by the wastegate duct. The valve body can operate at any position between the first and second positions.

Commonly, the valve arm and the valve body in typical wastegate assemblies have to be oriented in a specific orientation relative to one another in the turbine housing interior to efficiently control flow of exhaust gas through the wastegate channel. During manufacture of the turbocharger, if the valve arm and the valve body require orientation, an operator manually orient the valve arm relative to the valve body while the wastegate assembly is installed in the turbocharger tIf requiring orientation, the operator introduces error in the orientation of the valve arm relative to the valve body during installation of the wastegate assembly in the turbocharger, thus requiring the wastegate assembly to be scrapped.

As such, there remains a need to provide an improved wastegate assembly for a turbocharger.

SUMMARY OF THE INVENTION AND ADVANTAGES

The present invention provides a wastegate assembly for controlling flow of exhaust gas to a turbine housing interior of a turbocharger. The wastegate assembly includes a valve arm moveable between a first position and a second position to control the flow of the exhaust gas to the turbine housing interior of the turbocharger.

The valve arm includes a proximal end, a distal end spaced from the proximal end, and a valve arm orientation projection spaced from the distal end and extending away from the proximal end. The wastegate assembly also includes a valve body coupled to the distal end of the valve arm and moveable with the valve arm between the first and second positions to control the flow of the exhaust gas. The valve body includes a valve body orientation component.

The orientation projection of the valve arm extends toward and is orientable with the orientation component of the valve body to orient the valve arm relative to the valve body, and the valve body is disposed between the orientation projection of the valve arm and the distal end of the valve arm.

During manufacture of the turbocharger, an operator may be required to manually orient the valve arm relative to the valve body while the wastegate assembly is installed in the turbocharger. The orientation projection of the valve arm and the orientation component of the valve body automatically orient the valve arm relative to the valve body according to the poke yoke principle. The orientation projection of the valve arm and the orientation component of the valve body prevent the operator from misorienting the valve arm relative to the valve body because the orientation projection of the valve arm and the orientation component of the valve body prevent the valve body from being coupled to the distal end of the valve arm in an incorrect orientation. Said differently, the valve body can only be coupled to the distal end of the valve arm when the orientation projection of the valve arm and the orientation component of the valve body are oriented with one another. In this way, the orientation projection of the valve arm and the orientation component of the valve body facilitate automatic orientation (e.g. automatic alignment) in three spatial dimensions.

Because the operator is prevented from misorienting the valve arm relative to the valve body, less error is introduced during installation of the wastegate assembly in the turbocharger, thus requiring less wastegate assemblies from being scrapped. In turn, scrapping less wastegate assemblies reduces the overall cost of manufacturing the turbochargers. Additionally, the operator is not required to measure the orientation of the valve arm relative to the valve body, thus allowing for quicker installation of the wastegate assembly during manufacture of the turbocharger and further reducing the cost of manufacturing the turbocharger. Furthermore, because the valve arm and the valve body are much more likely to be correctly oriented relative to one another, the wastegate assembly results in more efficient control of the flow of the exhaust gas to the turbine housing interior of the turbocharger

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is a perspective view partially in cross-section of a turbine housing having an interior surface defining a turbine housing interior, with the wastegate assembly including a valve arm including a valve arm orientation projection, and with the wastegate assembly including a valve body including a valve body orientation component;

FIG. 3A is a perspective view of a wastegate assembly according to one embodiment of the present invention, with the orientation projection presenting a flat arm surface and extending transversely from the proximal end of the valve arm and with a gap defined between the orientation projection of the valve arm and the orientation component of the valve body;

FIG. 3B is a perspective view of the valve body according to one embodiment of the present invention, with the orientation component of the valve body presenting a flat body surface on an outer rim of the valve body;

FIG. 4A is a perspective view of a wastegate assembly according to another embodiment of the present invention, with the valve arm extending from both the proximal end of the valve arm and a main arm component of the valve arm;

FIG. 4B is a perspective view of the valve body according to one embodiment of the present invention, with the valve body having a stepped configuration with an outer rim and the orientation component disposed at least partially on the outer rim;

FIG. 5A is a perspective view of the wastegate assembly according to another embodiment of the present invention, with the orientation component of the valve body disposed on a side of the valve body, and the main arm component of the valve arm extends from a curved component toward the proximal end of the valve arm proximate to the side of the valve body that the orientation component is disposed on;

FIG. 5B is a perspective view of the valve body according to another embodiment of the present invention, with the valve body having an inner rim defining a machined indentation;

FIG. 6A is a perspective view of the wastegate assembly according to another embodiment of the present invention, with the orientation projection extending from the valve arm at an angle;

FIG. 6B is a perspective view of the valve body according to another embodiment of the present invention, with the valve body including the orientation component between the inner and outer rims;

FIG. 7A is a perspective view of the wastegate assembly according to another embodiment of the present invention, with the orientation projection extending from the main arm component of the valve arm;

FIG. 7B is a perspective view of the valve body according to another embodiment of the present invention, with the valve body including the stepped configuration having the inner rim, with the orientation component disposed at least partially on the inner rim;

DETAILED DESCRIPTION OF THE INVENTION

Figure 1:
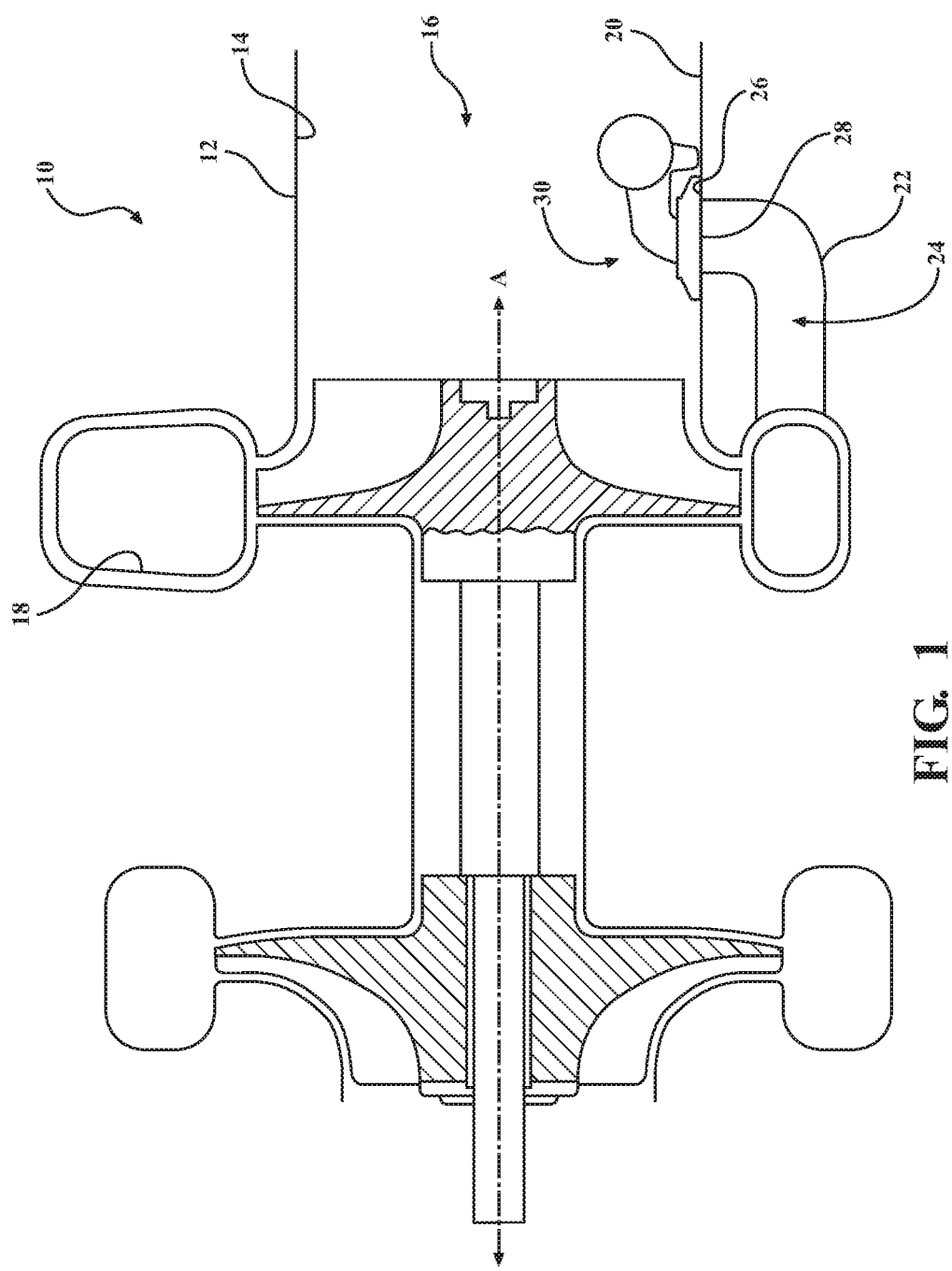
FIG. 1 is a schematic illustration of a turbocharger including a wastegate duct defining a wastegate channel, a valve seat, and a wastegate assembly.

With reference to the Figures, wherein like numerals indicate like parts throughout the several views, a turbocharger 10 is shown schematically in FIG. 1. The turbocharger 10 delivers compressed air to an internal combustion engine by receiving exhaust gas from the internal combustion engine. The turbocharger 10 includes a turbine housing 12, and the turbine housing 12 includes an interior surface 14 defining a turbine housing interior 16.

The interior surface 14 extends between a turbine housing inlet 18 and a turbine housing outlet 20. The turbine housing inlet 18 is defined at one end of the interior surface 14 and is in fluid communication with the internal combustion engine and the turbine housing interior 16 for delivering exhaust gas from the internal combustion engine to the turbine housing interior 16. The turbine housing outlet 20 is defined at an opposite end of the interior surface 14 and is in fluid communication with the turbine housing interior 16 for discharging exhaust gas from the turbine housing interior 16.

The turbine housing 12 also includes a wastegate duct 22 disposed downstream of the turbine housing inlet 18. The wastegate duct 22 defines a wastegate channel 24 that is in fluid communication with the turbine housing inlet 18 for discharging exhaust gas from the turbine housing inlet 18 by bypassing the turbine housing interior 16. The turbine housing 12 further includes a valve seat 26 disposed about the wastegate channel 24 at a channel outlet 28 of the wastegate channel 24.

The turbocharger 10 also includes a wastegate assembly 30 for controlling flow of exhaust gas to the turbine housing interior 16. The wastegate assembly 30 includes a valve arm 32 moveable between a first position and a second position to control flow of the exhaust gas to the turbine housing interior 16 of the turbocharger 10. In the first, or fully closed, position as shown in FIG. 2, the valve body 40 is engaged with the valve seat 26 to prevent flow of exhaust gas through the wastegate channel 24 defined by the wastegate duct 22. In the second, or fully open, position not illustrated, the valve body 40 is disengaged with the valve seat 26 to allow flow of exhaust gas through the wastegate channel 24 defined by the wastegate duct 22. The valve body 40 can operate at any position between the first and second positions. The valve arm 32 includes a proximal end 34, a distal end 36 spaced from the proximal end 34, and a valve arm orientation projection 38 spaced from the distal end 36 and extending away from the proximal end 34.

The wastegate assembly 30 also includes a valve body 40 coupled to the distal end 36 of the valve arm 32. The valve body 40 is moveable with the valve arm 32 between the first and second positions to control the flow of the exhaust gas. The valve body 40 includes a valve body orientation component 42. The orientation projection 38 of the valve arm 32 extends toward and is orientable with the orientation component 42 of the valve body 40 to orient the valve arm 32 relative to the valve body 40, and the valve body 40 is disposed between the orientation projection 38 of the valve arm 32 and the distal end 36 of the valve arm 32. Notably, not all of the valve body 40 must be disposed between the distal end 36 of the valve arm 32 and the orientation projection 38 of the valve arm 32. Only a portion of the valve body 40 may be disposed between the distal end 36 of the valve arm 32 and the orientation projection 38 of the valve arm 32.

During manufacture of the turbocharger 10, an operator may be required to manually orient the valve arm 32 relative to the valve body 40 while the wastegate assembly 30 is installed in the turbocharger 10. The orientation projection 38 of the valve arm 32 and the orientation component 42 of the valve body 40 automatically orient the valve arm 32 relative to the valve body 40 according to the poke yoke principle where the operator can only assemble components in the correct orientation. The orientation projection 38 of the valve arm 32 and the orientation component 42 of the valve body 40 prevent the operator from misorienting the valve arm 32 relative to the valve body 40 because the orientation projection 38 of the valve arm 32 and the orientation component 42 of the valve body 40 prevent the valve body 40 from being coupled to the distal end 36 of the valve arm 32 in an incorrect orientation. Said differently, the valve body 40 can only be coupled to the distal end 36 of the valve arm 32 when the orientation projection 38 of the valve arm 32 and the orientation component 42 of the valve body 40 are oriented with one another. In this way, the orientation projection 38 of the valve arm 32 and the orientation component 42 of the valve body 40 facilitate automatic orientation (e.g. automatic alignment) in three spatial dimensions.

Because the operator is prevented from misorienting the valve arm 32 relative to the valve body 40, less error is introduced during installation of the wastegate assembly 30 in the turbocharger 10, thus requiring less wastegate assemblies 30 from being scrapped. In turn, scrapping less wastegate assemblies 30 reduces the overall cost of manufacturing the turbochargers 10. Additionally, the operator is not required to measure the orientation of the valve arm 32 relative to the valve body 40, thus allowing for quicker installation of the wastegate assembly 30 during manufacture of the turbocharger 10 and further reducing the cost of manufacturing the turbocharger 10. Furthermore, because the valve arm 32 and the valve body 40 are much more likely to be correctly oriented relative to one another, the wastegate assembly 30 results in more efficient control of the flow of the exhaust gas to the turbine housing interior 16 of the turbocharger 10.

In some embodiments, as shown in FIGS. 4A and 5A, the valve arm 32 of the wastegate assembly 30 has a curved component 44 adjacent the distal end 36, and the valve arm 32 of the wastegate assembly 30 has a main arm component 46 extending between the proximal end 34 and the curved component 44. In these embodiments, the orientation projection 38 of the valve arm 32 extends from at least one of the proximal end 34 and the main arm component 46 of the valve arm 32. In other words, in these embodiments, the orientation projection 38 of the valve arm 32 may extend from the proximal end 34 of the valve arm 32, may extend from the main arm component 46 of the valve arm 32, or may extend from both the proximal end 34 and the main arm component 46 of the valve arm.

The orientation projection 38 of the valve arm 32 extending from at least one of the proximal end 34 and the main arm component 46 allows the orientation projection 38 to orient with the orientation component 42 of the valve body away from the distal end 36 of the valve arm 32. Said differently, a distance exists between both the orientation projection 38 of the valve arm 32 and the orientation component 42 of the valve body 40 as compared to the distal end 36 of the valve arm 32. This distance advantageously allows the valve arm 32 to be oriented relative to the valve body 40 with greater precision. Additionally, the orientation projection 38 of the valve arm 32 extending from at least one of the proximal end 34 and the main arm component 46 allows the orientation projection 38 of the valve arm 32 and the orientation component 42 of the valve body 40 to be oriented exterior to where the distal end 36 of the valve arm 32 is coupled to the valve body 40.

In the embodiments where the orientation projection 38 extends from at least one of the proximal end 34 and the main arm component 46, the orientation projection 38 of the valve arm 32 may extend transversely from the proximal end 34 of the valve arm 32, as shown in FIG. 3A. In other embodiments where the orientation projection 38 extends from at least one of the proximal end 34 and the main arm component 46, the orientation projection 38 of the valve arm 32 may extend transversely from the main arm component 46 of the valve arm 32, as shown in FIG. 7A.

In the embodiments where the orientation projection 38 extends transversely from either the proximal end 34 of the valve arm 32 or transversely from the main arm component 46 of the valve arm 32, the orientation projection 38 may extend perpendicularly or substantially perpendicularly from either the proximal end 34 of the valve arm 32 or the main arm component 46 of the valve arm 32. It is to be appreciated, however, that the orientation projection 38 may instead extend from either the proximal end 34 of the valve arm 32 or the main arm component 46 of the valve arm at an angle between zero and ninety degrees, as shown in FIG. 6A. In the embodiment where the orientation projection 38 extends at an angle between zero and ninety degrees, the orientation component 42 may be disposed on the valve body 40 such that the orientation component 42 is angled between zero and ninety degrees, as shown in FIG. 6B.

In certain embodiments, as shown in FIG. 3A, the orientation projection 38 of the valve arm 32 presents a flat arm surface 48 facing the orientation component 42 of the valve body 40 for limiting the orientation of the valve arm 32 relative to the valve body 40. Although not required, the flat arm surface 48 improves the kinematics of the wastegate assembly 30 and allows more precise orientation of the valve arm 32 relative to the valve body 40 by limiting the amount of possible orientations between the valve arm 32 and the valve body 40. The flat arm surface 48 also increases the ease of manufacture of the valve arm 32. The flat arm surface 48 may be cast with the orientation projection 38 of the valve arm 32, or may be machined after the orientation projection 38 of the valve arm is formed.

The orientation projection 38 of the valve arm 32 may be integral with the valve arm 32. For example, the orientation projection 38 may be cast with the valve arm 32 such that the valve arm 32 and the orientation projection 38 are integral with one another. Alternatively, the orientation projection 38 of the valve arm 32 may be a separate component than the valve arm 32. For example, the orientation projection 38 may be formed as a separate component and later joined to the valve arm 32, for instance, by welding, to become integral with the valve arm 32.

In some embodiments, the orientation component 42 of the valve body 40 is disposed on a side 50 of the valve body 40, and the main arm component 46 of the valve arm 32 extends from the curved component 44 toward the proximal end 34 of the valve arm 32 proximate to the side 50 of the valve body 40 that the orientation component 42 is disposed on. The main arm component 46 may extend from curved component 44 toward the proximal end 34 at a circumferential location on the side 50 of the valve body 40, and the orientation component 42 of the valve body 40 may be disposed at the circumferential location on the side 50 of the valve body 40.

In the embodiments where the main arm component 46 of the valve arm 32 extends from the curved component 44 proximate to the side 50 of the valve body 40 that the orientation component 42 is dispose on, less material is needed to manufacture the valve arm 32, thus allowing easier and more cost-efficient manufacture of the valve arm 32. Additionally, the operator can quickly orient the valve arm 32 relative to the valve body 40 by orienting the valve arm 32 and the valve body 40 such that the orientation projection 38 of the valve arm 32 and the orientation component 42 of the valve body are on the same side 50 as one another. Moreover, the orientation projection 38 of the valve arm 32 and the orientation component 42 of the valve body 40 are in close proximity to one another, limiting the space that the wastegate assembly 30 occupies in the turbine housing interior 16 of the turbocharger 10.

In some embodiments, as illustrated in FIG. 2, a gap 52 is defined between the orientation projection 38 of the valve arm 32 and the orientation component 42 of the valve body 40 when the orientation projection 38 of the valve arm 32 is orientated with the orientation component 42 of the valve body 40. The gap 52 allows the valve arm 32 to be oriented relative to the valve body 40 while simultaneously allowing some margin of movement to exist before the valve body 40 is coupled to the distal end 36 of the valve arm 32. Said differently, the gap 52 compensates for tolerances of the valve arm 32 and the valve body 40, specifically because the valve body 40 is placed flat against the valve seat 26 around the wastegate duct 22 before the valve body 40 is coupled to the distal end 36 of the valve arm 32. It is to be appreciated that no gap may be defined between the orientation projection 38 of the valve arm 32 and the orientation component 42 of the valve body 40 when the orientation projection 38 of the valve arm 32 is orientated with the orientation component 42 of the valve body 40.

In some embodiments, the gap 52 defined between the orientation projection 38 of the valve arm 32 and the orientation component 42 of the valve body 40 is between zero and three millimeters. It is to be appreciated that this range is merely exemplary. For instance, the gap may be more than three millimeters, or may be more than five millimeters. The gap 52 may be between 0.5 and 2.0 millimeters, may be between zero and one millimeters, and may be between five and six millimeters.

In certain embodiments, as shown in FIGS. 3B, 4B, 5B, 6B, and 7B, the orientation component 42 of the valve body 40 presents a flat body surface 54 facing the orientation projection 38 of the valve arm 32 for limiting the orientation of the valve arm 32 relative to the valve body 40. Although not required, the flat body surface 54 improves the kinematics of the wastegate assembly 30 and allows more precise orientation of the valve arm 32 relative to the valve body 40 by limiting the amount of possible orientations between the valve arm 32 and the valve body 40. The flat body surface 54 also increases the ease of manufacture of the valve body 40. The flat body surface 54 may be cast with the orientation projection 38 of the valve arm 32, or may be machined after the orientation component 42 of the valve body 40 is formed.

In some embodiments, the valve body 40 has a stepped configuration with an inner rim 56 proximate to the distal end 36 of the valve arm 32, and an outer rim 58 spaced from the inner rim 56 away from the distal end 36 of the valve arm 32. In the embodiments where the valve body 40 has the stepped configuration, the orientation component 42 of the valve body 40 may be disposed least partially on the inner rim 56, as shown in FIG. 7B. Alternatively, in the embodiments where the valve body 40 has the stepped configuration, the orientation component 42 of the valve body 40 may be disposed at least partially on the outer rim 58, as shown in FIGS. 4B and 5B. Further still, in the embodiments where the valve body 40 has the stepped configuration, the orientation component 42 of the valve body 40 may be disposed least partially on the inner rim 56 and at least partially on the outer rim 58. It is also to be appreciated that orientation component 42 of the valve body 40 may be disposed between the inner rim 56 and the outer rim 58, as shown in FIG. 6B.

It is to be appreciated that the stepped configuration may have more than the inner rim 56 and the outer rim 58. For instance, the stepped configuration may have an intermediary rim disposed between the inner rim 56 and the outer rim 58.

In the embodiments where the valve body 40 has the stepped configuration having the inner rim 56 and the outer rim 58, and where the orientation component 42 is disposed at least partially on the outer rim 58, the inner rim 56 may define a machined indentation, as shown in FIGS. 5A and 5B. The machined indentation may be formed as a result of machining the orientation component 42 into the outer rim 58 of the valve body 40. In this embodiment, the machined indentation and the orientation component 42 may be formed by the same machining stroke, and may be coplanar. Additionally, in this embodiment, the machined indentation may be non-functional and may not assist in orienting the valve body 40 relative to the valve arm 32.

The orientation component 42 of the valve body 40 may be integral with the valve body 40. Alternatively, the orientation component 42 of the valve body 40 may be a separate component than the valve body 40. It is to be appreciated that the orientation component 42 may be formed as a separate component and later joined to the valve body 40, for example, by welding, to become integral with the valve body 40. It is also to be appreciated that the orientation component 42 may be cast with the valve body 40 such that the valve body 40 and the orientation component 42 are integral with one another.

In some embodiments, the wastegate assembly 30 is a dual block wastegate assembly 60, as shown in FIG. 2. In the embodiments where the wastegate assembly 30 is the dual block wastegate assembly 60, the valve arm 32 and the valve body 40 are fixed together inside of the turbine housing 12 to ensure a seal between the valve body 40 and the valve seat 26 to prevent leakage of exhaust gas flowing through the wastegate channel 24 of the wastegate duct 22. It is to be appreciated, however, that the wastegate assembly 30 may be other types of wastegate assemblies 30, such as a wastegate assembly 30 including a washer and a spring, or a wastegate assembly 30 having three or more components fixed together.

A method of manufacturing the turbocharger 10 includes the step of positioning the valve body 40 against the valve seat 26 of the turbine housing 12. The method also includes the step of positioning the distal end 36 of the valve arm 32 against the valve body 40 such that the orientation projection 38 of the valve arm 32 orients with the orientation component 42 of the valve body 40. The method further includes the step of fixing the distal end 36 of the valve arm 32 to the valve body 40 to maintain the orientation of the valve arm 32 relative to the valve body 40.

The step of fixing the valve arm 32 to the valve body 40 may be further defined as welding the valve arm 32 to the valve body 40. It is to be appreciated, however, that the valve arm 32 may be fixed to the valve body 40 through use of a mechanical fastener such as a washer or a bolt, or may be fixed to the valve body 40 through use of an adhesive, among other possibilities.

In an alternative embodiment, the wastegate assembly 30 is also for controlling flow of exhaust gas to the turbine housing interior 16 of the turbocharger 10. The wastegate assembly 30 includes the valve arm 32 moveable between the first, or fully closed, position and the second, or fully open, position to control flow of the exhaust gas to the turbine housing interior 16 of the turbocharger 10. The valve body 40 can operate at any position between the first and second positions. In the first position as shown in FIG. 2, the valve body 40 is engaged with the valve seat 26 to prevent flow of exhaust gas through the wastegate channel 24 defined by the wastegate duct 22. In the second position not illustrated, the valve body 40 is disengaged with the valve seat 26 to allow flow of exhaust gas through the wastegate channel 24 defined by the wastegate duct 22.

Figure 8A:
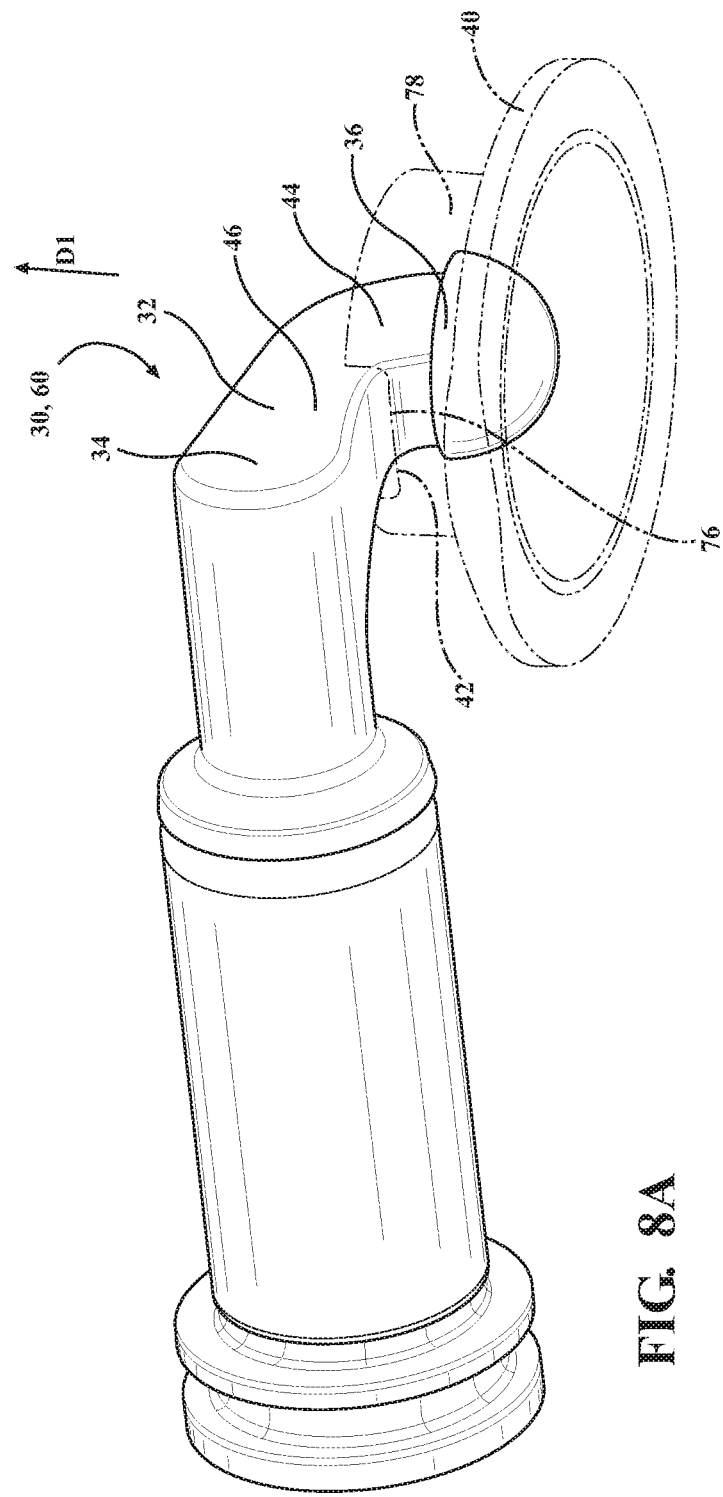
FIG. 8A is a perspective view partially in phantom of the wastegate assembly according to the alternative embodiment of the present invention, with the valve arm disposed in an orientation recess between the proximal and distal ends of the valve arm to orient the valve arm relative to the valve body.

The valve arm 32 includes the proximal end 34 and the distal end 36 spaced from the proximal end 34, as shown in FIG. 8A. The wastegate assembly 30 also includes the valve body 40 coupled to the distal end 36 of the valve arm 32, and the valve body 40 is moveable with the valve arm 32 between the first and second positions to control the flow of the exhaust gas.

Figure 8B:
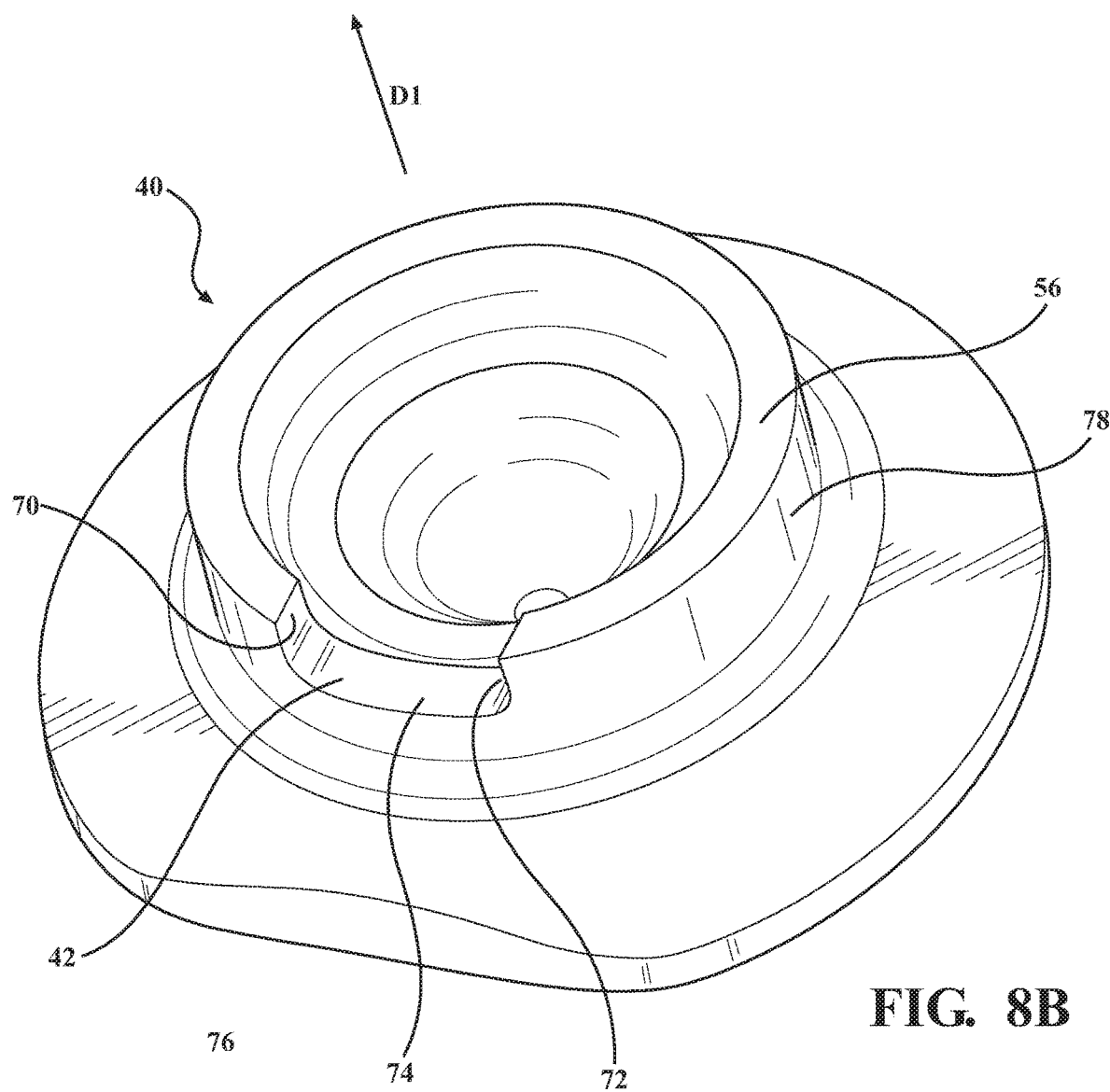
FIG. 8B is a perspective view of the valve body according to the alternative embodiment of the present invention, with valve body having the orientation component presenting a first surface, a second surface, and a third surface collectively establishing a generally U-shaped configuration defining the orientation recess, and with a wall presenting a rim surface facing in the first direction and spaced from the third surface the first direction.

In this alternative embodiment, the valve body 40 includes the valve body orientation component 42. The orientation component 42 of the valve body 40 presents a first surface 70, a second surface 72 spaced from and facing the first surface 70, and a third surface 74 extending between the first and second surfaces 70, 72 and facing in a first direction D1. The first, second, and third surfaces 70, 72, 74 collectively establish a generally U-shaped configuration defining an orientation recess 76, as shown in FIG. 8B.

In this alternative embodiment, the valve body 40 also includes a wall 78 extending circumferentially about a majority of the distal end 36 of the valve arm 32 from the first surface 70 of the orientation component 42 to the second surface 72 of the orientation component 42. In this alternative embodiment, the wall 78 extends greater than 180 degrees about the distal end 36 of the valve arm 32, which is a majority. The wall 78 presents a rim surface 80 facing in the first direction D1 and is spaced from the third surface 74 of the orientation component 42 in the first direction D1. In this alternative embodiment, the valve arm 32 is disposed in the orientation recess 76 between the proximal and distal ends 34, 36 of the valve arm 32 to orient the valve arm 32 relative to the valve body 40, as shown in FIG. 8A.

In this alternative embodiment, the valve arm 32 of the wastegate assembly 30 may be easier to manufacture due to a less intricate design of the valve arm 32. Additionally, the valve body 40 may be formed from a single piece of bar stock of aluminum or steel. Because the bar stock is expensive, the less material that must be removed from the single piece of bar stock to form the valve body 40 results in less cost to form the valve body 40. As such, the orientation component 42 presenting the first, second, and third surfaces 70, 72, 74 collectively establishing the generally U-shaped configuration defining the orientation recess 76 minimizes the amount of material that must be removed from the bar stock to form the valve body 40, thus minimizing costs to form the valve body 40.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A wastegate assembly for controlling flow of exhaust gas to a turbine housing interior of a turbocharger, said wastegate assembly comprising:
   a valve arm moveable between a first position and a second position to control the flow of the exhaust gas to the turbine housing interior of the turbocharger, said valve arm comprising:
      a proximal end,
      a distal end spaced from said proximal end, and
      a valve arm orientation projection spaced from said distal end and extending away from said proximal end; and
   a valve body coupled to said distal end of said valve arm and moveable with said valve arm between said first and said second positions to control the flow of the exhaust gas, said valve body comprising a valve body orientation component;
   wherein said orientation projection of said valve arm extends toward and is orientable with said orientation component of said valve body to orient said valve arm relative to said valve body,
   wherein said valve body is disposed between said orientation projection of said valve arm and said distal end of said valve arm,
   wherein said valve arm has a curved component adjacent said distal end and a main arm component extending between said proximal end and said curved component,
   wherein said curved component is curved along a primary axis of said valve arm, and
   wherein said orientation projection of said valve arm extends from at least one of said proximal end and said main arm component of said valve arm.

2. The wastegate assembly as set forth in claim 1, wherein said orientation projection of said valve arm extends transversely from said proximal end of said valve arm.

3. The wastegate assembly as set forth in claim 1, wherein said orientation projection of said valve arm extends transversely from said main arm component of said valve arm.

4. The wastegate assembly as set forth in claim 1, wherein said orientation projection of said valve arm presents a flat arm surface facing said orientation component of said valve body for limiting the orientation of said valve arm relative to said valve body.

5. The wastegate assembly as set forth in claim 1, wherein said orientation projection of said valve arm is integral with said valve arm.

6. The wastegate assembly as set forth in claim 1, wherein said orientation component of said valve body is disposed on a side of said valve body, and said main arm component of said valve arm extends from said curved component toward said proximal end of said valve arm proximate to said side of said valve body that said orientation component is disposed on.

7. The wastegate assembly as set forth in claim 1, wherein a gap is defined between said orientation projection of said valve arm and said orientation component of said valve body when said orientation projection of said valve arm is orientated with said orientation component of said valve body.

8. The wastegate assembly as set forth in claim 7, wherein said gap is between one half and five millimeters.

9. The wastegate assembly as set forth in claim 1, wherein said orientation component of said valve body presents a flat body surface facing said orientation projection of said valve arm for limiting the orientation of said valve arm relative to said valve body.

10. The wastegate assembly as set forth in claim 1, wherein said valve body has a stepped configuration with an inner rim proximate to said distal end of said valve arm, and an outer rim spaced from said inner rim away from said distal end of said valve arm, and said orientation component of said valve body is disposed at least partially on said inner rim.

11. The wastegate assembly as set forth in claim 1, wherein said valve body has a stepped configuration with an inner rim proximate to said distal end of said valve arm, and an outer rim spaced from said inner rim away from said distal end of said valve arm, and said orientation component of said valve body is disposed at least partially on said outer rim.

12. The wastegate assembly as set forth in claim 1, wherein said orientation component of said valve body is integral with said valve body.

13. The wastegate assembly as set forth in claim 1, wherein said wastegate assembly is a dual block wastegate assembly.

14. A turbocharger for delivering compressed air to an internal combustion engine by receiving exhaust gas from the internal combustion engine, said turbocharger comprising:
    a turbine housing comprising:
        an interior surface defining a turbine housing interior, said interior surface extending between:
            a turbine housing inlet defined at one end of said interior surface and in fluid communication with the internal combustion engine and said turbine housing interior for delivering the exhaust gas from the internal combustion engine to said turbine housing interior; and
            a turbine housing outlet defined at an opposite end of said interior surface and in fluid communication with said turbine housing interior for discharging the exhaust gas from said turbine housing interior; and
        a wastegate duct disposed downstream of the turbine housing inlet and defining a wastegate channel in fluid communication with said turbine housing inlet for discharging the exhaust gas from said turbine housing inlet by bypassing said turbine housing interior;
        a valve seat disposed about said wastegate channel at a channel outlet of said wastegate channel; and
    a wastegate assembly for controlling flow of the exhaust gas to said turbine housing interior, said wastegate assembly comprising:
        a valve arm moveable between a first position and a second position to control the flow of the exhaust gas to the turbine housing interior of the turbocharger, said valve arm comprising:
            a proximal end,
            a distal end spaced from said proximal end, and
            a valve arm orientation projection spaced from said distal end and extending away from said proximal end; and
        a valve body coupled to said distal end of said valve arm and moveable with said valve arm between said first and said second positions to control the flow of the exhaust gas, said valve body comprising a valve body orientation component,
    wherein said orientation projection of said valve arm extends toward and is orientable with said orientation component of said valve body to orient said valve arm relative to said valve body,
    wherein said valve body is disposed between said orientation projection of said valve arm and said distal end of said valve arm,
    wherein said valve arm has a curved component adjacent said distal end and a main arm component extending between said proximal end and said curved component,
    wherein said curved component is curved along a primary axis of said valve arm, and
    wherein said orientation projection of said valve arm extends from at least one of said proximal end and said main arm component of said valve arm.

15. The turbocharger as set forth in claim 14, wherein said orientation projection of said valve arm extends transversely from said proximal end of said valve arm.

16. The turbocharger as set forth in claim 14, wherein said orientation projection of said valve arm extends transversely from said main arm component of said valve arm.

17. The turbocharger as set forth in claim 14, wherein said orientation component of said valve body is disposed on a side of said valve body, and said main arm component of said valve arm extends from said curved component toward said proximal end of said valve arm proximate to said side of said valve body that said orientation component is disposed on.

18. The turbocharger as set forth in claim 14, wherein a gap is defined between said orientation projection of said valve arm and said orientation component of said valve body when said orientation projection is oriented with said orientation component of said valve body.

19. A method of manufacturing a turbocharger, with the turbocharger including a turbine housing including a wastegate duct defining a wastegate channel, and a valve seat disposed about the wastegate channel at a channel outlet of the wastegate channel; and a wastegate assembly including a valve arm comprising a proximal end, a distal end spaced from the proximal end, and a valve arm orientation projection spaced from the distal end and extending away from the proximal end; and a valve body coupled to the distal end of the valve arm, with the valve body comprising a valve body orientation component, with the valve arm having a curved component adjacent the distal end, wherein the curved component is curved along a primary axis of the valve arm, and a main arm component extending between the proximal end and the curved component, and with the orientation projection of the valve arm extending from at least one of the proximal end and the main arm component of the valve arm, said method comprising the steps of:

positioning the valve body against the valve seat of the turbine housing; positioning the distal end of the valve arm against the valve body such that the orientation projection of the valve arm extends from at least one of the proximal end and the main arm component of the valve arm, and orients with the orientation component of the valve body; and fixing the distal end of the valve arm to the valve body to maintain the orientation of the valve arm relative to the valve body.

20. The method of manufacturing the turbocharger as set forth in claim 19, wherein the step of fixing the valve arm to the valve body is further defined as welding the valve arm to the valve body.

21. A wastegate assembly for controlling flow of exhaust gas to a turbine housing interior of a turbocharger, said wastegate assembly comprising:

a valve arm moveable between a first position and a second position to control the flow of the exhaust gas to the turbine housing interior of the turbocharger, said valve arm comprising:

a proximal end, and a distal end spaced from said proximal end; and a valve body coupled to said distal end of said valve arm and moveable with said valve arm between said first and second positions to control the flow of the exhaust gas, said valve body comprising;

a valve body orientation component presenting a first surface, a second surface spaced from and facing said first surface, and a third surface extending between said first and second surfaces and facing in a first direction, with said first, second, and third surfaces collectively establishing a generally U-shaped configuration defining an orientation recess, and a wall extending circumferentially about a majority of said distal end of said valve arm from said first surface of said orientation component to said second surface of said orientation component, with said wall presenting a flat rim surface facing in said first direction and spaced from said third surface of said orientation component in said first direction;

wherein said valve arm is disposed in said orientation recess between said proximal and distal ends of said valve arm to orient said valve arm relative to said valve body.

\* \* \* \* \*